Sept. 17, 1935.  O. F. ECKROATE  2,014,679
REAMING APPARATUS
Filed June 28, 1933  2 Sheets-Sheet 2
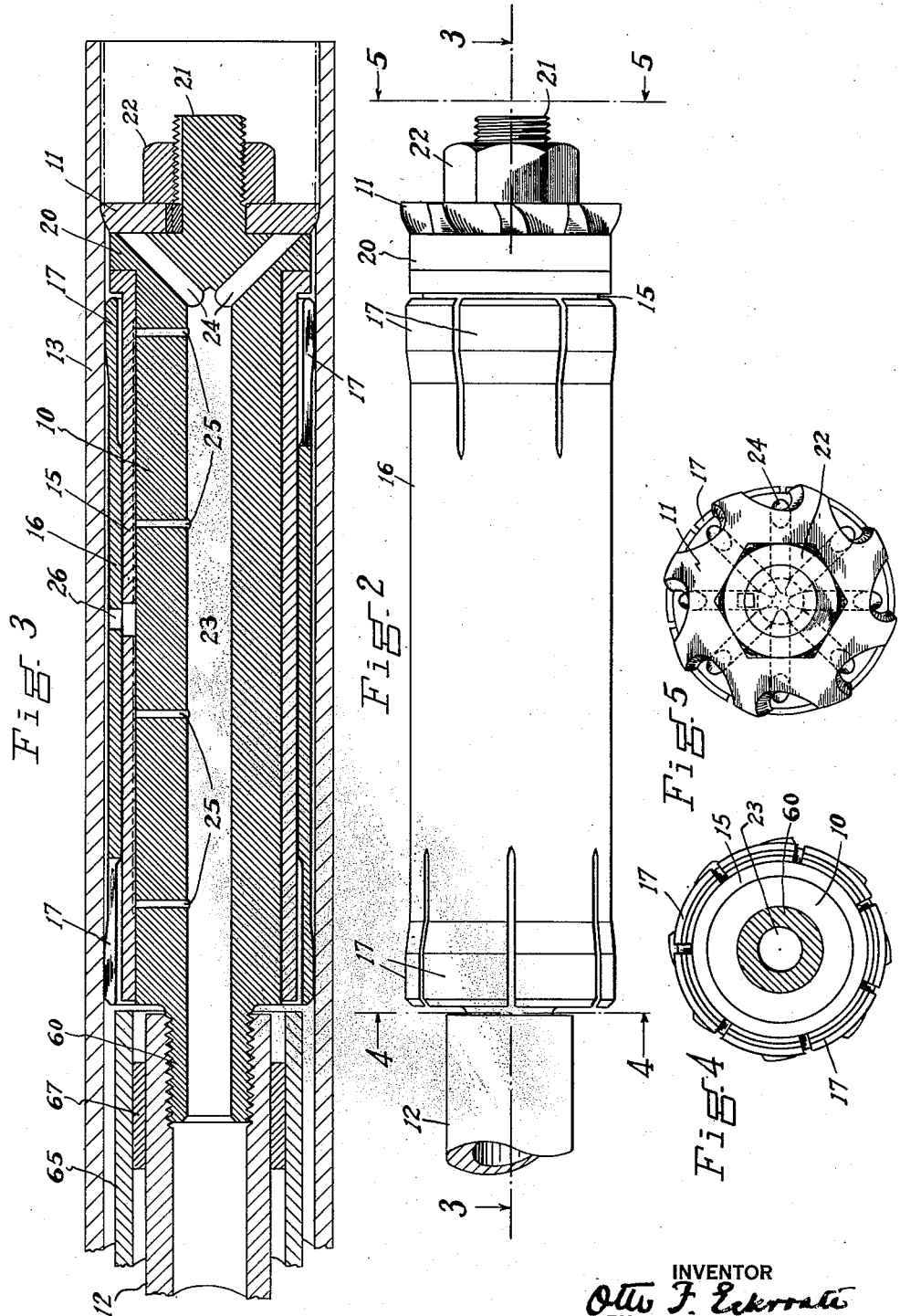

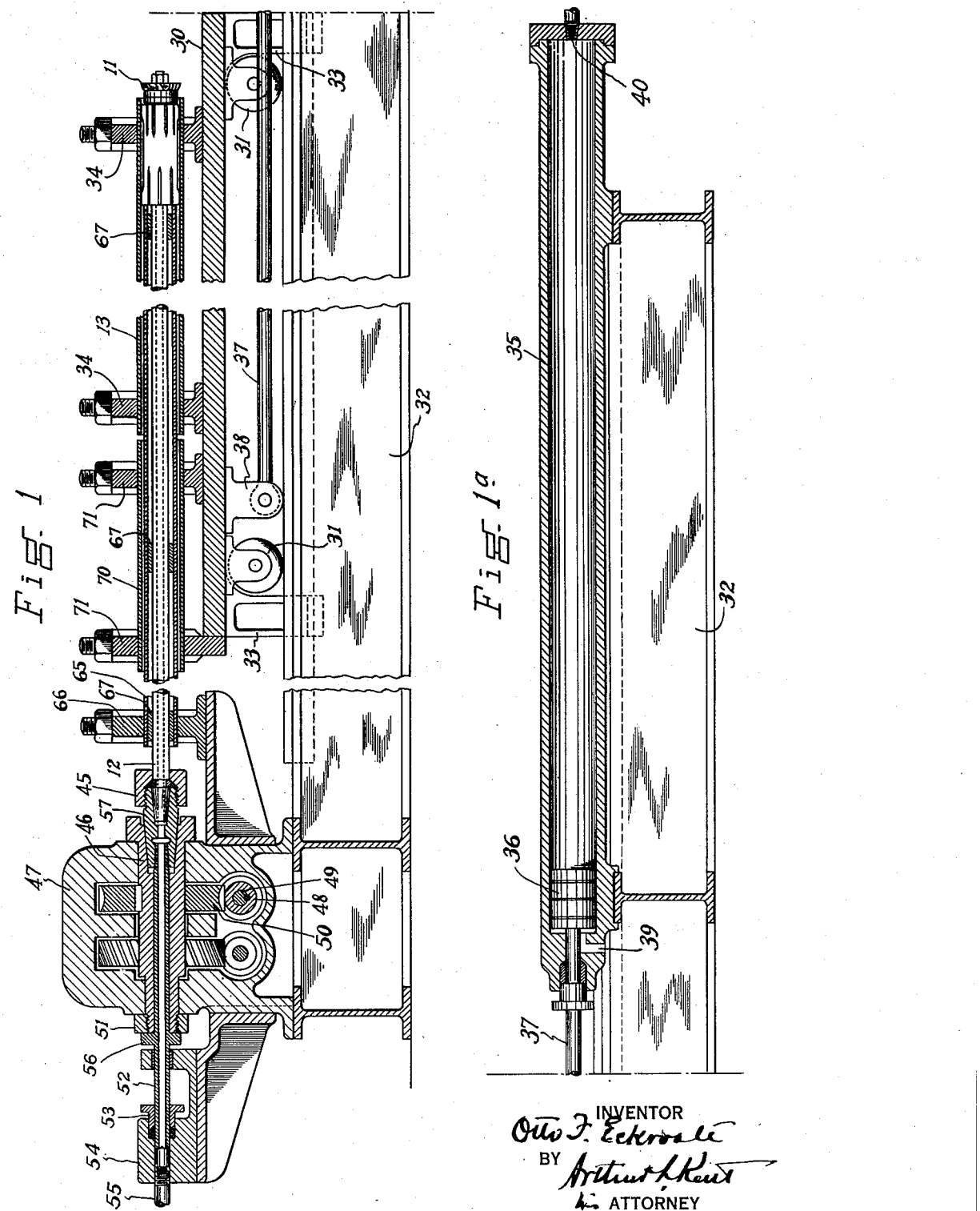

Patented Sept. 17, 1935

2,014,679

UNITED STATES PATENT OFFICE 2,014,679

REAMING APPARATUS

Otto F. Eckroate, Chippewa Township, Beaver County, Pa., assignor to The Babcock & Wilcox Tube Company, West Mayfield, Pa., a corporation of Pennsylvania Application June 28, 1933, Serial No. 677,973

13 Claims. (Cl. 77—3)

This invention relates to reamers and reaming machines. The invention has been made especially with the idea of providing apparatus capable of reaming long metal tubes of relatively small diameter and by which a true uniform bore having a smooth surface free from scratches may be obtained rapidly and at comparatively small cost.

It has not been found possible to produce hot finished or cold drawn tubes with the concentricity and uniformity of diameter required for many uses, and such tubes also lack the required smoothness of inside surface. A variation of as much as .03" in inside diameter is usual. In apparatus according to my invention, a single passage of the reamer gives to a usual hot finished or cold drawn tube a bore so true and uniform and with so smooth a surface as to satisfy such exacting requirements as those for working barrels for oil pumps without any grinding or polishing and with only a single pass of a burnishing tool. For example, tubes 18 to 20 feet long of 1¾" average inside diameter are regularly reamed to an inside diameter of 1¹¹⁄₁₆" within a maximum tolerance of .0015 above and .0015 below.

While, as stated, the invention has been made especially for reaming small tubes, by which I mean tubes having an inside diameter of from 1" or less up to 5 or 6 inches, apparatus according to the invention is not limited to use in reaming such tubes but is adaptable for use in reaming larger tubes or bores of other articles.

The invention comprises a reamer having a reaming tool or cutter mounted on the trailing end of a spindle which is rotatably mounted in and guided by a pilot or guide having two longitudinally spaced circumferential series of radially yielding resilient members which bear against the unreamed surface of the bore in advance of the cutter. A reaming machine according to the invention comprises, in combination with the reamer, means for mounting the tube to be reamed, a tension bar to one end of which the leading end of the reamer spindle is connected and which extends through the positioned tube from a suitable bar-holding means, and means for causing a relative rotary movement between the tube and the reaming tool and a relative longitudinal separating movement between the tube and the bar-holding means whereby the reamer is pulled through the tube with the reaming tool trailing its guide. Most desirably, the tube to be reamed is mounted on a longitudinally movable carriage which in the reaming operation is moved at a controlled rate in the direction away from the bar-holding means, and the relative rotation between the tube and the reaming tool is secured by rotating the tension bar and thereby the tool, the tube being mounted stationary on its carriage. The reamer will thus in effect be pulled through the tube by the bar against the resistance of the tool and the added resistance of the guide, and the driving bar and reamer spindle will thus be under tension which will have the effect of preventing vibration of these parts and eliminating chattering of the tool. By having the tool or cutter follow its guiding means instead of having it moved through the tube in advance of its guiding means, all the chips and particles produced by the cutter will be left behind the reamer and the lodging of particles between the guide and the finished surface of the bore and consequent scoring of the surface is entirely avoided. The guide or pilot serves to hold the reaming tool centered with respect to the average diameter of the bore, and because of the relatively wide longitudinal spacing of the resilient bore-engaging members, the effect on the tool of irregularities of the unreamed bore is greatly reduced so that such irregularities have little or no effect on the reamed bore.

A full understanding of the invention can best be given by a detailed description of a reamer and reaming machine embodying the features of the invention in the preferred form, and such a description will now be given in connection with the accompanying drawings, illustrating such a preferred embodiment, and in which:—

Figs. 1 and 1a are complemental views in longitudinal vertical section of the reaming machine with the reamer in position prior to starting the reaming operation;

Fig. 2 is a view in elevation of the reamer;

Fig. 3 is a section taken on line 3—3 of Fig. 2;

Fig. 4 is an end view of the reamer looking from the left in Fig. 2 as indicated by the line 4—4; and Fig. 5 is an end view looking from the right of Fig. 2 as indicated by the line 5—5.

Referring to the drawings, and first to Figs. 2 to 5, the reamer as shown in these figures comprises a spindle 10 which carries the rotary reaming tool or cutter 11 at its trailing end and has its leading end formed for connection to a driving bar 12 by which the reamer is pulled through the tube 13. The spindle 10 is journalled within a bushing 15 which, for a steel spindle, should preferably be of bronze or other suitable nonferrous metal. Fitted on the bushing 15 to move therewith, preferably by means of a driving fit, is a sleeve 16 of spring steel or other suitable strong spring metal which with the bushing forms the guide or pilot of the reamer. The sleeve is counterbored at its ends for clearance from the bushing, and the outside of the sleeve is machined, except at the ends, so as to leave the extreme end portions of greater diameter than the intermediate portions of the sleeve, and the counterbored end portions are each slotted to form a circumferential series of spring fingers 17. The end of the spindle 10 which carries the cutter has a flange 20 which provides a shoulder to bear against the end of the bushing 15 projecting beyond the end of the sleeve 16, and beyond the flange the spindle has a reduced extension or stud 21 to extend through a central opening in the cutter 11 and threaded to receive a nut 22 by which the cutter is held against the flat end of the spindle directly beyond the flange 20. The spindle 10 has a central bore 23 from the end of which branch holes 24 extend at an angle for the discharge of cooling and lubricating fluid between the blades of the cutter. Passages 25 are provided through the wall of the spindle for supplying the lubricating fluid to the bearing surfaces of the spindle and bushing, and the bushing may be provided with a longitudinal lubrication passage, as indicated by dotted lines in Fig. 3; and as shown at 26, openings are also provided through the bushing and the sleeve 16 for the passage of lubricant to the outside of the sleeve. The opening 26 through the bushing may be a circumferentially continuous opening provided by making the bushing in two parts spaced suitably apart.

The spring ends of the guide sleeve 16 formed by the spring fingers 17 are of a diameter sufficiently larger than the inside diameter of the tube to be bored, usually 40 to 50 thousandths of an inch larger, so that they have to be squeezed and collapsed in drawing the reamer into the tube and will then be under sufficient pressure so that because of their resiliency they will follow the irregularities in the bore of the tube. The spring fingers 17 should be stiff enough to offer sufficient resistance to hold the tool from being deflected from its path by the unequal resistance to its cutting action due to irregularities in the uncut bore of the tube. Because of the length of the guide sleeve, bearing only at its ends against the surface of the uncut bore, the deflection of the sleeve and of the spindle 10 by irregularities of the bore are greatly minimized and have practically no or very slight effect on the tool and on the finished bore. The long bushing 15 provides a good steady bearing for the spindle 10, and because of the resistance to relative longitudinal movement between the tube and reamer offered by the spring fingers 17, supplementing the resistance of the reaming tool to forward movement, the driving bar 12, and the spindle 10 which is pulled against the end of the bushing, are in tension during the cutting operation and the spindle flange 20 with the cutter clamped rigidly against it is held tightly against the end of the bushing 15. Vibration is thus reduced to a minimum and chattering of the tool is avoided.

Referring now to Figs. 1 and 1a, the tube 13 to be bored is mounted on a reciprocating bed or carriage 30 which, as shown, has running wheels 31 running on rails on a main frame 32 and is guided and steadied by downwardly extending guides 33. The tube is held stationarily in place on the carriage by means of screw clamps 34. For reciprocating the carriage, a hydraulic cylinder 35 is mounted on the frame 32 beyond the carriage and its piston 36 is connected by a rod 37 to a bracket 38 depending from the carriage. The cylinder 35 has ports 39 and 40, one at each end thereof, through which liquid from a suitable source of supply and controlled by usual and suitable means not shown may be forced into the cylinder to move the piston and thereby the carriage in either direction as desired and at the desired controlled rate.

The outer end of the driving bar 12 is detachably connected by means of a suitable coupling 45 to a driving spindle 46 which may be mounted and driven in any suitable manner. As shown, the spindle is journalled in a headstock 47 and driven by means of a worm 48 on a driving shaft 49 meshing with a worm gear 50 on the spindle. The spindle is held against longitudinal movement under the pull of the driving bar 12 by means of a thrust collar 51. Although so far as appears from the drawings, the machine has only a single driving bar 12 and the carriage 30 carries only a single tube to be reamed, in practice the machine has been made as a gang machine having a plurality of driving bars and a carriage for mounting a plurality of tubes. The headstock and driving gears shown are those of such a gang machine, there being two of the drive shafts 49, one of which drives spindles and driving bars alternating with those driven by the other.

The driving bar 12 is a hollow tubular bar through the bore of which lubricating fluid is supplied to the bore of the reamer spindle. For supplying lubricating fluid to the outer end of the bar, the driving spindle 46 is made tubular and a fluid supply tube 52 is provided extending through the spindle 46 and through a stuffing box 53 into a bore in a block 54 to which the fluid is supplied through a tube 55 leading from any suitable source of supply under suitable pressure. The fluid supply tube 52 has a collar 56 which bears against the end of the spindle, and the inner end of the tube is screw-threaded to take into the threaded end of a spindle cone 57 so that the tube may serve for tightening or releasing the cone.

The reamer may be connected to the end of the driving bar by any suitable means. As shown, the reamer spindle 10 has a reduced threaded end 60 which screws into the threaded end of the bore of the driving bar.

For further stiffening and steadying the driving bar 12, which may be of considerable length, a tube or sleeve 65 is provided which is placed over the bar and has its outer end rigidly held by stationary clamping means 66 by which the sleeve is held against either longitudinal or rotary movement. The inner end of the sleeve 65 extends to the inner end of the driving bar, and at this point is held concentric with the bar by means of a bushing 67. Other similar bushings 67 between the sleeve and the bar are located one at the outer end of the sleeve and others at spaced points intermediate the ends of the sleeve. These bushings serve as bearings for the bar, and the sleeve thus serves to strengthen and steady the bar, overcoming any tendency to vibration or whipping.

For guiding the reamer as the reaming tool nears the last end of the tube being reamed and the pilot or guide sleeve leaves the end of the tube, a guide tube 70 is mounted on the reciprocating table 30 held by clamps 71 in alignment with, and with its end close to, the end of the tube being reamed. This guide tube will be of the same internal diameter as the tube to be reamed, a different guide tube being used for each different size of tube reamed.

In the use of the reamer and machine, the tube to be reamed having been mounted on the carriage secured by the clamps 34, and a guide tube 70 of the proper size having been properly mounted in alignment with the tube, and the driving bar 12 having been threaded through the guide tube and the tube to be reamed and being connected to the driving spindle 46, and the reamer having been connected to the driving bar and the pilot or guide of the reamer having been drawn into the far end of the tube, and the reaming tool being then driven from the driving spindle 46 through the driving bar 12 to rotate at the proper rate, the carriage 30 is then moved at the proper rate to the right as the machine is viewed in Fig. 1 by the introduction of pressure liquid through the inlet port 39 to the cylinder 35. The tube is thus moved longitudinally away from the headstock 47, thereby causing in effect the reamer to be drawn through the tube. As the reamer approaches the last end of the tube, the pilot, as it leaves the end of the tube, enters the guide tube 70 and thus continues to guide the reaming tool and hold it centralized in the bore until the tool has passed completely through the tube. The movement of the carriage is then stopped and the reamed tube removed. The carriage is then moved in the opposite direction to back the reamer out of the guide tube 70 and the reamer is disconnected from the driving bar. A new tube to be reamed is mounted on the carriage, and the carriage having been moved far enough to the left, as viewed in Fig. 1, so that the end of the driving bar extends beyond the far end of the tube, the reamer is again connected to the bar and the carriage is moved to the right to pull the reamer pilot into the end of the tube and the reaming operation is repeated on the new tube as before.

During the reaming operation, suitable lubricating liquid is forced through the tube 52 and through the hollow driving bar 12 into the bore of the reamer spindle 10, from which it flows through the openings 24 to lubricate and cool the tool and the tube, and through the openings 25 to lubricate the spindle bearing, and through the openings 26 to lubricate the bearing surfaces of the sleeve 16.

The rate at which the reamer is made to operate will vary according to the material of the tube being reamed. For reaming tubes of carbon steel and low alloy steel with cutters of high grade tool steel, it is the practice to revolve the cutting tool at a rate such as to give a cutting speed of from 90 to 125 feet per minute, and to move the carriage at a rate to give a feed of from 0.006" to 0.009" per revolution of the tool. The actual R. P. M. of the tool consequently varies for different diameters and roughly decreases in direct proportion as the diameter of the tube increases. It is desirable to keep the cutting speed up close to the maximum that the tool will stand.

What is claimed is:

1. A reamer, comprising a cylindrical guide having two longitudinally spaced circumferential series of radially yielding resilient members to bear against the bore to be reamed, a spindle rotatably mounted in said guide having its leading end formed for connection to a tension bar, and a reaming cutter secured to the trailing end of the spindle with its front side facing the guide.

2. A reamer, comprising a cylindrical guide of a length greater than twice its diameter and having at each end a circumferential series of radially yielding resilient members to bear against the bore to be reamed, a spindle rotatably mounted in said guide having at its trailing end a thrust collar to bear against the end of the guide and having its leading end formed for connection to a driving bar, and a reaming cutter secured to the trailing end of said spindle adjacent the thrust collar for trailing the guide in its movement through the bore being reamed.

3. A reamer, comprising a cylindrical guide sleeve of elastic metal of a length greater than twice its diameter and having its ends shaped and slitted to form at each end of the sleeve a circumferential series of radially yielding resilient members to bear against the bore to be reamed, a spindle rotatably mounted in said guide sleeve having at its trailing end a thrust collar to bear against the end of the guide sleeve and having its leading end formed for connection to a driving bar, and a reaming cutter secured to the trailing end of said spindle adjacent the thrust collar for trailing the guide sleeve in its movement through the bore being reamed.

4. Tube reaming apparatus, comprising tube mounting means, a tension bar, bar-holding means from which the bar is adapted to extend through a tube mounted on the tube mounting means, a reamer connected to the free end of said bar comprising guiding means for resiliently engaging the unreamed bore of the tube and a reaming tool beyond but close to the trailing end of the guiding means, means for causing relative rotary movement between the tube and the reaming tool and relative longitudinal separating movement between the tube and the bar-holding means to cause the reamer to be pulled through the tube with the reaming tool trailing its guiding means, the guiding means serving to guide the reaming tool and to provide bar-tensioning resistance to said relative longitudinal movement, and a guide having a cylindrical bore of the same internal diameter as the tube to be reamed mounted in alignment with the tube to be reamed and close to the end thereof to receive said guiding means as it leaves the tube.

5. Tube reaming apparatus, comprising a tube carriage, a driving bar, bar-holding and driving means from which the bar is adapted to extend through a tube mounted on the carriage, means for stiffening and steadying the driving bar comprising a fixed sleeve enclosing the bar and spaced bushings between the bar and the sleeve, a reamer connected to the free end of said bar comprising a reaming tool and guiding means for resiliently engaging the unreamed bore of the tube, the reaming tool being rotatively mounted beyond but close to the trailing end of the guiding means, and means for giving the carriage a controlled movement away from the bar-holding and driving means to cause the reamer to be pulled through the tube with the reaming tool trailing its guiding means and to tension the driving bar.

6. A reamer, comprising a cylindrical guide formed by a journal bushing and a sleeve of elastic metal mounted on said bushing, the ends of the sleeve being of greater diameter than the intermediate portion thereof and slitted to form at each end of the sleeve a circumferential series of radially yielding resilient members to bear against the bore to be reamed, a spindle journalled in said bushing having a thrust collar at its trailing end to bear against the end of the bushing and having its leading end formed for connection to a driving bar, and a reaming cutter secured on the trailing end of the spindle against said thrust collar for trailing the guide in its movement through the bore being reamed.

7. A reamer, comprising a cylindrical guide formed by a journal bushing and a sleeve of elastic metal mounted on said bushing, the ends of the sleeve being of greater diameter than the intermediate portion thereof and slitted to form at each end of the sleeve a circumferential series of radially yielding resilient members to bear against the bore to be reamed, a spindle journalled in said bushing having a thrust collar at its trailing end to bear against the end of the bushing and having its leading end formed for connection to a driving bar, and a reaming cutterter secured on the trailing end of the spindle beyond and close to said thrust collar for trailing the guide in its movement through the bore being reamed, the spindle being hollow and having discharge ducts from its bore for supplying lubricant to the reaming tool and to the bearing surfaces of the spindle and bushing.

8. Tube reaming apparatus, comprising tube mounting means, a tension bar, bar holding means from which the bar is adapted to extend through a tube mounted on the tube mounting means, a reamer connected to the free end of said bar comprising guiding means for resiliently engaging the unreamed bore of the tube and a reaming tool beyond but close to the trailing end of the guiding means, and means for causing relative rotary movement between the tube and the reaming tool and relative longitudinal separating movement between the tube and the bar holding means to cause the reamer to be pulled through the tube with the reaming tool trailing its guiding means, the guiding means serving to guide the reaming tool and to provide bar-tensioning resistance to said relative longitudinal movement.

9. Tube reaming apparatus, comprising tube mounting means, a driving bar, bar holding and driving means from which the bar is adapted to extend through a tube mounted on the tube mounting means, a reamer comprising a cylindrical guide having two longitudinally spaced circumferential series of radially yielding resilient members to bear against the unreamed bore of the tube and a spindle rotatably mounted in said guide the leading end of which is connected to the free end of the driving bar and a reaming cutter secured to the spindle beyond the trailing end of the guide, and means for causing a relative longitudinal separating movement between the tube and the bar holding and driving means to cause the reamer to be pulled through the tube with the reaming cutter trailing its guide, the guide serving to guide the reaming cutter and to provide bar tensioning resistance to said relative longitudinal movement.

10. Tube reaming apparatus, comprising tube mounting means, a driving bar, bar holding and driving means from which the bar is adapted to extend through a tube mounted on the tube mounting means, a reamer comprising a cylindrical guide having two longitudinally spaced circumferential series of radially yielding resilient members to bear against the unreamed bore of the tube and a spindle rotatably mounted in said guide the leading end of which is connected to the free end of the driving bar and a reaming cutter secured to the spindle beyond the trailing end of the guide, the driving bar and the spindle being tubular to provide a passage for lubricating and cooling liquid and the spindle having discharge ducts leading from its bore, means for supplying lubricating and cooling fluid to the bore of the driving bar, and means for causing a relative longitudinal separating movement between the tube and the bar holding and driving means to cause the reamer to be pulled through the tube with the reaming cutter trailing its guide.

11. Tube reaming apparatus, comprising a tube carriage, a driving bar, bar holding and driving means from which the bar is adapted to extend through a tube mounted on the carriage, a reamer connected to the free end of said bar comprising a reaming tool and guiding means for resiliently engaging the unreamed bore of the tube, the reaming tool being rotatively mounted beyond but close to the trailing end of the guiding means, and means for giving the carriage a controlled movement away from the bar holding and driving means to cause the reamer to be pulled through the tube with the reaming tool trailing its guiding means and to tension the driving bar.

12. In a reaming apparatus, the combination of a reamer comprising a cylindrical guide having two longitudinally spaced circumferential series of radially yielding resilient members to bear against the bore to be reamed and a spindle rotatably mounted in said guide and a reaming tool on the spindle beyond the trailing end of the guide, a driving bar connected to the leading end of the spindle, holding and driving means for said bar, and means for causing a relative longitudinal separating movement between the article being reamed and the bar holding and driving means to cause the reamer to be pulled through the bore with the reaming tool trailing its guide.

13. In a reaming apparatus, the combination of a reamer comprising a guide and a spindle rotatably mounted in said guide and a reaming tool on said spindle beyond the end of the guide, means for causing relative rotary movement between the reaming tool and the article being reamed, and means for pulling the reamer through the bore to be reamed with the reaming tool trailing the guide.

OTTO F. ECKROATE.